United States Patent
Zhang

(10) Patent No.: US 8,698,922 B2
(45) Date of Patent: Apr. 15, 2014

(54) BLACK LEVEL CORRECTION FOR IMAGING PIXELS

(75) Inventor: Guangbin Zhang, Cupertino, CA (US)

(73) Assignee: Omni Vision Technologies, Inc., Santa Clara, CA (US)

( * ) Notice: Subject to any disclaimer, the term of this patent is extended or adjusted under 35 U.S.C. 154(b) by 241 days.

(21) Appl. No.: 13/396,150

(22) Filed: Feb. 14, 2012

(65) Prior Publication Data

US 2013/0206959 A1  Aug. 15, 2013

(51) Int. Cl.
 *H04N 5/361* (2011.01)
 *H04N 5/357* (2011.01)
 *H04N 5/217* (2011.01)

(52) U.S. Cl.
 CPC ............ *H04N 5/361* (2013.01); *H04N 5/3575* (2013.01); *H04N 5/2176* (2013.01)
 USPC .......................... 348/243; 348/245; 250/208.1

(58) Field of Classification Search
 CPC .... H04N 5/361; H04N 5/3575; H04N 5/2176
 USPC ................................ 250/208.1; 348/243–245
 See application file for complete search history.

(56) References Cited

U.S. PATENT DOCUMENTS

2009/0046180 A1*  2/2009  Shibano et al. ............... 348/243

* cited by examiner

*Primary Examiner* — Thanh Luu
*Assistant Examiner* — Renee Naphas
(74) *Attorney, Agent, or Firm* — Blakely Sokoloff Taylor & Zafman LLP

(57) ABSTRACT

A technique for obtaining a corrected pixel value is disclosed. The technique includes measuring a first dark current of a dark calibration pixel of a pixel array and measuring a second dark current of an imaging pixel of the pixel array. A dark current ratio is calculated based on the first dark current and the second dark current. An image charge is acquired with the imaging pixel where the image charge is accumulated over a first time period. A charge is acquired with the dark calibration pixel where the charge is accumulated over a second time period. The second time period is approximately equal to the first time period divided by the dark current ratio. A corrected imaging pixel value is calculated using a first readout from the imaging pixel and a second readout from the dark calibration pixel.

20 Claims, 5 Drawing Sheets

BLACK LEVEL CORRECTION FOR IMAGING PIXELS

TECHNICAL FIELD

This disclosure relates generally to optics and in particular but not exclusively, relates to image sensors.

BACKGROUND INFORMATION

A complimentary metal-oxide semiconductor ("CMOS") image sensor includes an array of pixels that generate electrical signals in response to incident light. Ideally, the electrical signal generated by a pixel accurately represents the amount of light incident on that pixel. In practice, however, even when the pixel is not being exposed to light, it still generates some electrical signal. Such signal, generally referred to as the "dark current," is undesired because it reduces the dynamic range of the image sensor.

Since it is extremely difficult to eliminate dark current completely, black level correction ("BLC") methods have been developed to effectively mitigate the error that dark current may introduce into an imaging pixel. Some BLC methods utilize pixels in the pixel array that are physically shielded from light by a metal layer or other shield disposed over the pixels. These designated pixels are typically referred to as the optically black pixels (hereinafter, "dark calibration pixels") and are usually clustered in rows or columns immediately adjacent to an imaging region of unshielded pixels (hereinafter, "imaging pixels").

Conventional BLC methods are best suited for the condition when the rate of dark current generation is the same for both the dark calibration pixels and the imaging pixels. The dark calibration pixels and the imaging pixels generally have the same offset error introduced by various shared circuit elements in readout circuitry (e.g. amplifiers and analog-to-digital converters ("ADC")). Therefore, when the dark calibration pixels and the imaging pixels have the same dark current, one BLC method is to simply subtract the dark calibration pixel readout from the imaging pixel readout. Because the dark calibration pixel readout includes both the offset error from readout circuitry and the dark current error, subtracting the dark calibration readout from the imaging pixel readout yields an imaging pixel value correcting for offset and dark current error.

However, this BLC method is not suitable for the case when the rate of dark current generation is different (non-uniform) for the dark calibration pixels and the imaging pixels because the dark current component of the dark calibration pixel readout will not match the imaging pixel. Therefore, simply subtracting the dark calibration pixel readout from the imaging pixel readout will yield inaccurate corrected imaging pixel values. In practice, the dark calibration pixels may have additional factors that contributed to dark currents that are substantially different from dark currents of the imaging pixels. One of the factors may be mechanical stresses due to the physical shielding layer over them. These mechanical stresses on the dark calibration pixels may lead to higher or lower dark currents compared to the imaging pixel dark currents. The non-uniformity in dark currents between the dark calibration pixels and the imaging pixels makes a BLC method that takes into account the non-uniformity of dark currents and the circuitry offset desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for black level correction are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
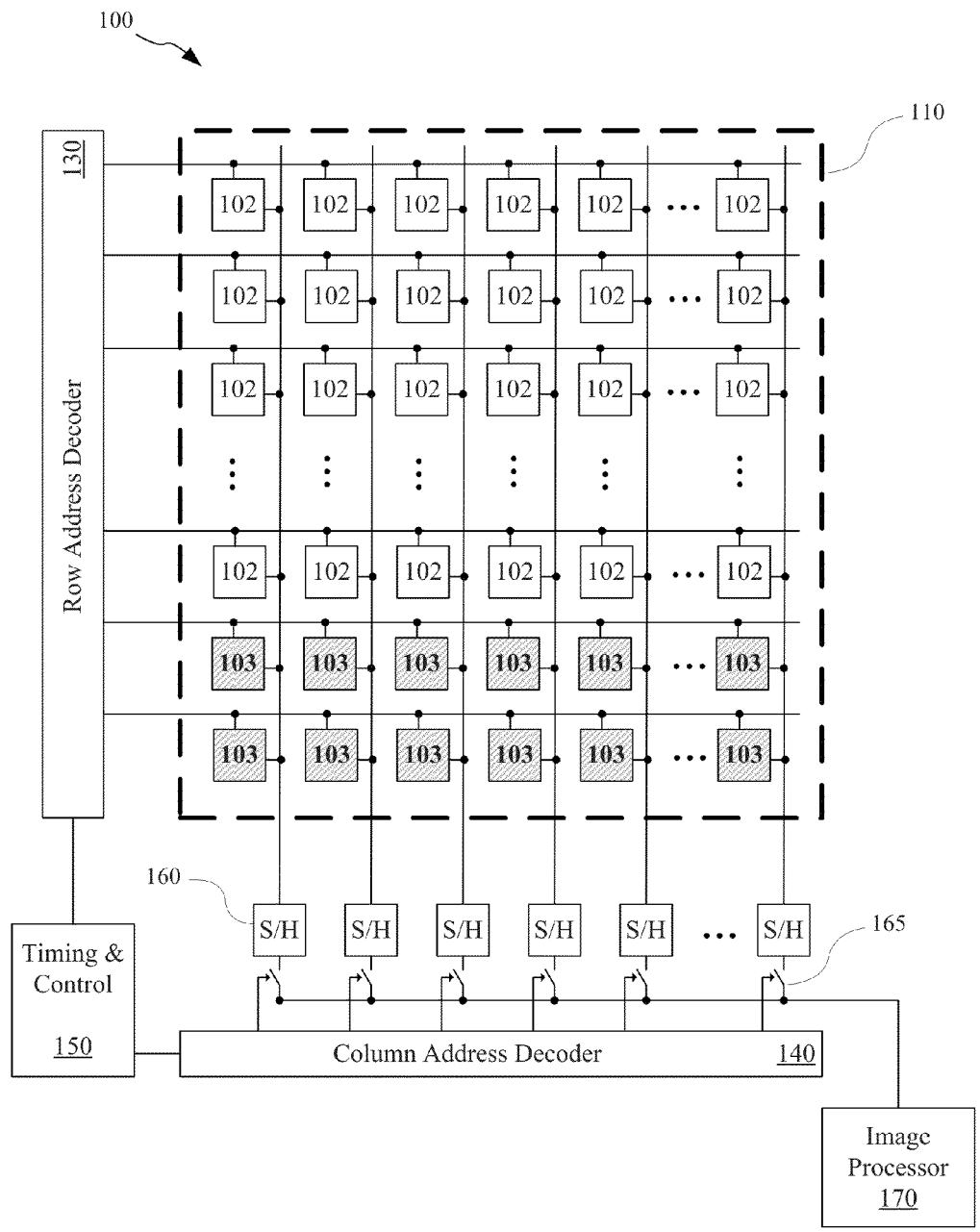
FIG. 1 is a block diagram illustrating an imaging system, in accordance with an embodiment of the disclosure.

FIG. 1 is a block diagram illustrating an imaging system 100, in accordance with an embodiment of the disclosure. Imaging system 100 contains pixel array 110, which includes imaging pixels 102 disposed in an imaging region exposed to light during an exposure time, and dark calibration pixels 103, which are physically shielded from light and not disposed in the imaging region. Dark calibration pixels 103 are arranged in two rows following the last row of imaging pixels 102. It will be appreciated that such an arrangement is purely exemplary; in other embodiments, black calibration pixels 103 may be located anywhere within pixel array 110, and may be arranged in rows, in columns, as individual pixels, or in any combination of the above.

Still referring to FIG. 1, timing & control unit 150 uses row address decoder 130 and column address decoder 140 to control the readout sequence and the exposure time of all pixels in pixel array 110. An "exposure time" may be referred to as an "integration time." The word "exposure" or "exposed" may be used in reference to black calibration pixels even though they may be covered by an optically opaque material, and may not actually be exposed to incident light. In one embodiment, timing & control unit 150 employs a column-parallel readout scheme, where it first configures row address decoder 130 to simultaneously expose all pixels in a given row for a predefined exposure time. Next, the electrical charge accumulated on each pixel (sometimes called "pixel data") during the exposure time is transferred into a sample & hold register 160 that corresponds to the pixel's column. Finally, column address decoder 140 uses switches 165 to sequentially read out each pixel data from sample & hold registers 160 into image processor 170 for further processing.

Once a row of pixels has been fully transferred, row address decoder 130 may read out the next row into the sample & hold registers 160. For the purpose of brevity, some circuit elements, such as signal amplifiers, analog-to-digital converters, or correlated double sampling circuitry, were omitted from FIG. 1.

It will be appreciated that in other embodiments, timing & control unit 150 may employ different readout schemes. For example, in configurations where dark calibration pixels 103 are arranged in columns instead of rows, a row-parallel readout scheme may be implemented instead of the column-parallel scheme described above. In a row-parallel scheme, each column of pixels is exposed simultaneously for a predefined period of time. Further, in configurations where dark calibration pixels 103 are arranged in both rows and columns or even scattered around pixel array 110 in no particular order, a "random-access" readout scheme may be used. In that scheme, each pixel is individually exposed and read out, which allows independent exposure times for each pixel.

Timing & control unit 150 manages the readout of dark currents for imaging pixels 102 and dark calibration pixels 103. Dark current is measured when the imaging pixels are shielded from light (e.g. a dark room or a closed camera shutter). Although the dark currents for imaging pixels 102 and dark calibrations pixels 103 may be non-uniform, the ratio between the two has been found to be predictably near constant and is not dramatically affected by temperature, voltage, or other system factors. Therefore, the predictability of the ratio (hereinafter, "dark current ratio"), can be used in BLC methods to improve accuracies.

As mentioned above, black calibration pixels are sometimes used in BLC methods on the assumption that a measurement of the black calibration pixel is representative of the dark current of an imaging pixel. But, that assumption is often wrong because of differences (e.g. mechanical stress) between the black calibration pixels and the imaging pixels that lead to different dark current values. However, calculating the dark current ratio between the black calibration pixel(s) and the imaging pixel(s) allows for calculated adjustments that can make measuring black calibration pixels, once again, representative of the dark current of an imaging pixel. This results in more accurate pixel values for imaging pixels.

Figure 2:
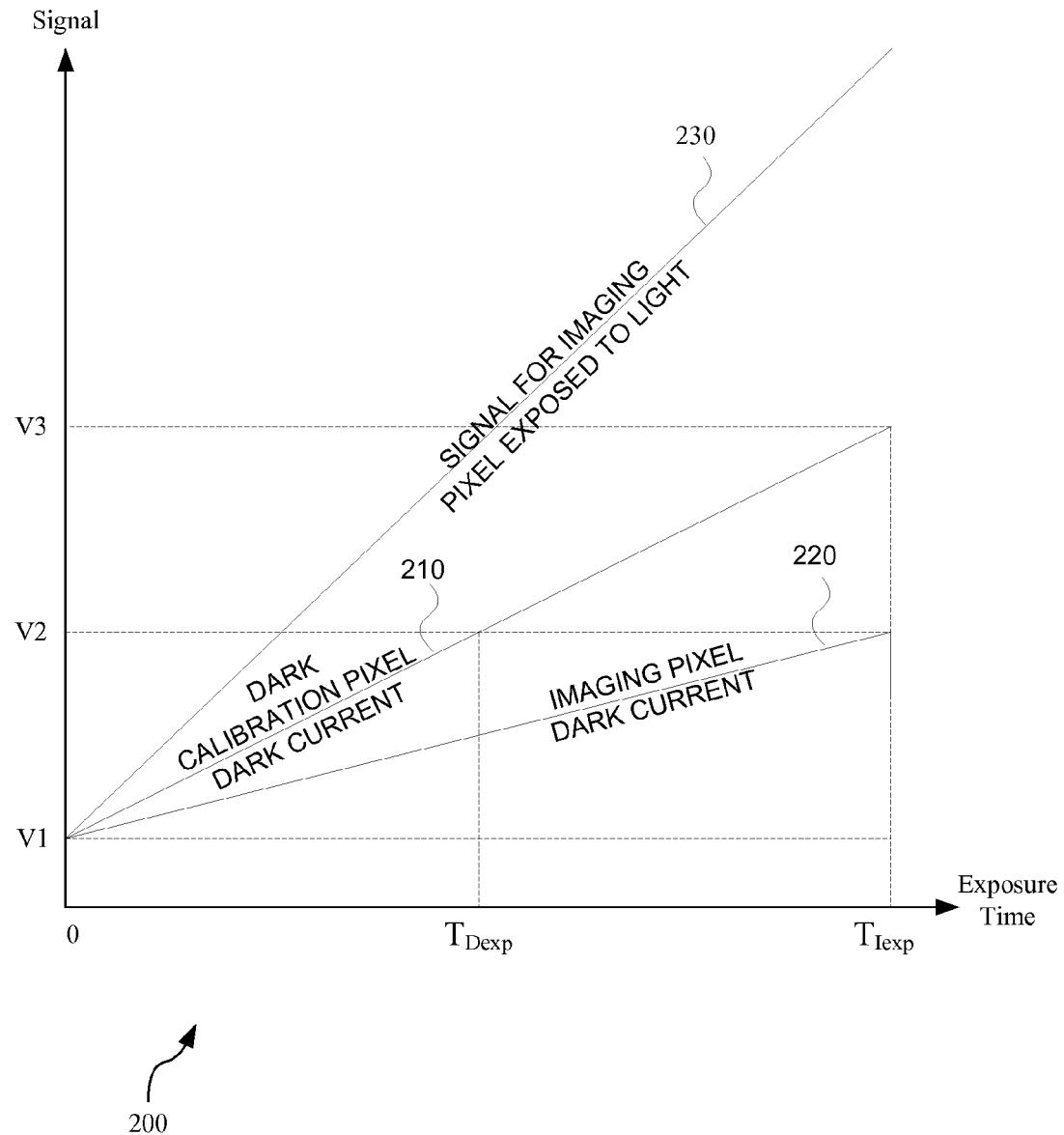
FIG. 2 is a chart that illustrates dark currents of an imaging pixel and a black calibration pixel, in accordance with an embodiment of the disclosure.

One way to adjust (based on the dark current ratio) the measurement of black calibration pixels is to manipulate the time period in which the black calibration pixels are measured. FIG. 2 is a chart 200 that illustrates an example dark current of a black calibration pixel and an imaging pixel achieving the same voltage level in different time periods. Chart 200 includes line 210 representing dark current accumulation in a dark calibration pixel among dark calibration pixels 103. Line 220 represents dark current accumulation in an imaging pixel among imaging pixels 102. Line 210 and line 220 both start at voltage V1 because a dark calibration pixel and an imaging pixel would have the same offset (V1) in their readout circuitry. In the same exposure period, line 220 reaches voltage V2, while line 210 reaches voltage V3. In the illustrated embodiment, the voltage difference between V3 and V2 is the same as the difference between V2 and V1, meaning the dark current of the dark calibration pixel is twice the dark current of the imaging pixel. The dark current ratio ("DCR") is given by the following equation:

DCR=(dark current of dark calibration pixel/dark current of imaging pixel)

Thus, the DCR between the dark calibration pixel and the imaging pixel in chart 200 is two. Correspondingly, it takes line 220 twice the time ($T_{Iexp}$) to reach voltage V2 as it takes line 210 ($T_{Dexp}$). Since dark current is typically generated at a constant rate, the amount of accumulated dark current is linearly proportional to the exposure time. Hence, it can be seen from chart 200 that the dark calibration pixel would need to be exposed for half the time as the imaging pixel to approximate the dark current of the imaging pixel, in chart 200.

The exposure time of a black calibration pixel ($T_{Dexp}$) to approximate or represent the dark current of an imaging pixel is given by the following equation:

$T_{Dexp}$=(Imaging Pixel Exposure Period)/(Dark Current Ratio).

It follows then, that in chart 200, $T_{Dexp}$=($T_{Iexp}$)/(2). $T_{Dexp}$ (exposure time for dark calibration pixels) can then be set to be ½ of $T_{Iexp}$ (exposure time for imaging pixels 102). This compensates for the increased dark current generation rate in dark calibration pixels (e.g. dark calibration pixels 103), without affecting the readout offset component, which is independent of the exposure time. As a result, the amount of dark current accumulated on both types of pixels by the end of their respective exposure times is the same, and so is the level of readout offset added during readout. So, by adjusting the exposure time of the dark calibration pixels to reflect the dark current of the imaging pixels, circuitry offsets and non-uniformity of dark currents can both be accounted for when the imaging pixel readout is subtracted from the dark calibration pixel value.

In chart 200, the illustrated DCR is two. However, it should be appreciated that a DCR of two was chosen for illustration purposes only. The DCR may be less than one (e.g. 1/10, 1/3, or 4/5) or greater than one (e.g. 3/2, 2/1, or 10/1). When the DCR is greater than one, the dark calibration exposure time ($T_{Dexp}$) will be less than the imaging pixel exposure time ($T_{Iexp}$). When the DCR is less than one, the dark calibration exposure time ($T_{Dexp}$) will be more than the imaging pixel exposure time ($T_{Iexp}$). In some contexts, it may be preferable to have a DCR greater than one because that allows the dark calibration pixel to have the shortened exposure period rather than the imaging pixel. This may be especially preferable in low light situations where it may be advantageous to have an exposure period of the imaging pixel be as long as possible or when the imaging system is trying to take consecutive images and the exposure period of either the dark calibration pixel should be as short as possible.

Line 230 is included in chart 200 as representing an imaging signal of the imaging pixel when the imaging pixel is exposed to light. While dark calibration pixels 103 are shielded from light, imaging pixels 102 are exposed to light. So, in addition to dark current, they also generate some charge as a result of photo-conversion of incident photons when exposed to light. Thus, the total accumulated signal on imaging pixels 102, represented by line 230, is typically well above the dark current level. Additionally, all signals include a readout offset component, fixed at the level of V1, irrespective of whether the pixel is a dark calibration pixel or not.

Figure 3:
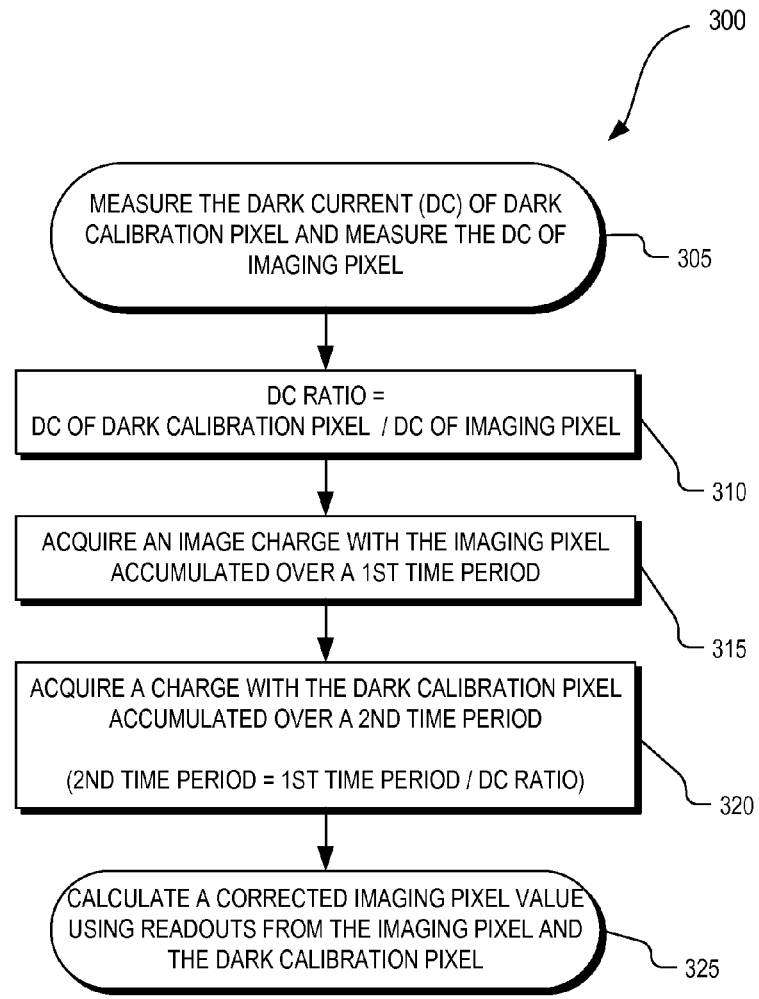
FIG. 3 is a flow chart illustrating a process of operation of an imaging system to obtain corrected pixel values, in accordance with an embodiment of the disclosure.

FIG. 3 shows a process 300 for obtaining a corrected pixel value from an imaging pixel using the equations described above, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In process block 305, the dark current of a dark calibration pixel and the dark current of an imaging pixel are measured over the same time period. Dark currents may be measured by covering pixel array 110 with an opaque material, and exposing all the pixels. The opaque material may be the mechanical shutter of a camera that is closed for the whole exposure period. In one embodiment more than one dark calibration pixel is measured to obtain a dark current value. The dark current measurement of dark calibration pixels (e.g. dark calibration pixels 103) may be an average (including a weighted average, mean, median, or other central tendency calculation) of all the dark calibration pixels or dark calibrations pixels in a certain distance proximity to an imaging pixel. In one embodiment, more than one imaging pixel is measured to obtain a dark current value. The dark current measurement of imaging pixels (e.g. imaging pixels 102) may be an average (including a weighted average, mean, median, or other central tendency calculation) of all the imaging pixels or imaging pixels in a certain distance proximity to an imaging pixel.

In process block 310, a dark current ratio is calculated. The DCR is calculated by dividing the dark current of the dark calibration pixel (or an average dark current of dark calibration pixels) by the dark current (or an average dark current of imaging pixels) of the imaging pixel. The DCR value may be calculated only once and stored in a non-volatile memory, such as PROM or OTP. This may be done at a factory. Alternatively, the DCR may be recalculated each time imaging system 100 is powered up or each time before a user takes a photo or captures a video clip; then the DCR may be stored in either non-volatile or volatile memory, such as DRAM.

An alternative method to establish the DCR includes an iterative process. In the iterative process, exposure time for dark calibration pixels differ from exposure time for imaging pixels by a temporary ratio, and the temporary ratio is gradually changed until the resulting image is closest to an ideal "black" image found in a memory. That final temporary ratio value will then serve as the DCR.

In process block 315, an image charge accumulated over a first time period (e.g. $T_{Iexp}$) is acquired from an imaging pixel. In one embodiment, the first time period is the exposure period of the imaging pixels and may be set based on a variety of factors such as the lighting conditions of the scene, the ISO speed and other automatic or user-defined settings. A row or a column of imaging pixels may be exposed for the first time period.

In process block 320, a charge accumulated over a second time period (e.g. $T_{Dexp}$) is acquired from the dark calibration pixel. The second time period is calculated as:

Second Time Period=(First Time Period)/(DCR)

When the DCR is greater than one, the second time period will be less than the first time period and the second time period will be a portion of the first time period. When the DCR is less than one, the second time period will be more than the first time period and the first time period will be a portion of the second time period. A whole row or column of dark calibration pixels may be exposed for the second time period.

In process block 325, a calculation is made from readouts from the imaging pixel exposed for the first time period and the dark calibration pixel exposed for the second time period. Based on those readouts, a correcting imaging pixel value is calculated for the imaging pixel. In one embodiment, the readout from the dark calibration pixel is subtracted from the readout from the imaging pixel (which may include image data from light incident on the imaging pixel). The subtraction may be performed in analog or digital domain.

In one embodiment, because of slight variations of dark current and/or readout offset across dark calibration pixels 103, the readout for the dark calibration pixel is an average of all or some subset of dark calibration pixels 103. In one embodiment, different dark calibration pixels are subtracted from different imaging pixels. For example, only dark calibration pixels 103 closest to a certain imaging pixel will be taken into account (and averaged), while dark calibration pixels 103 located farther from the certain imaging pixel will be disregarded (or given less weight in the case of a weighted averaging).

Figure 4A:
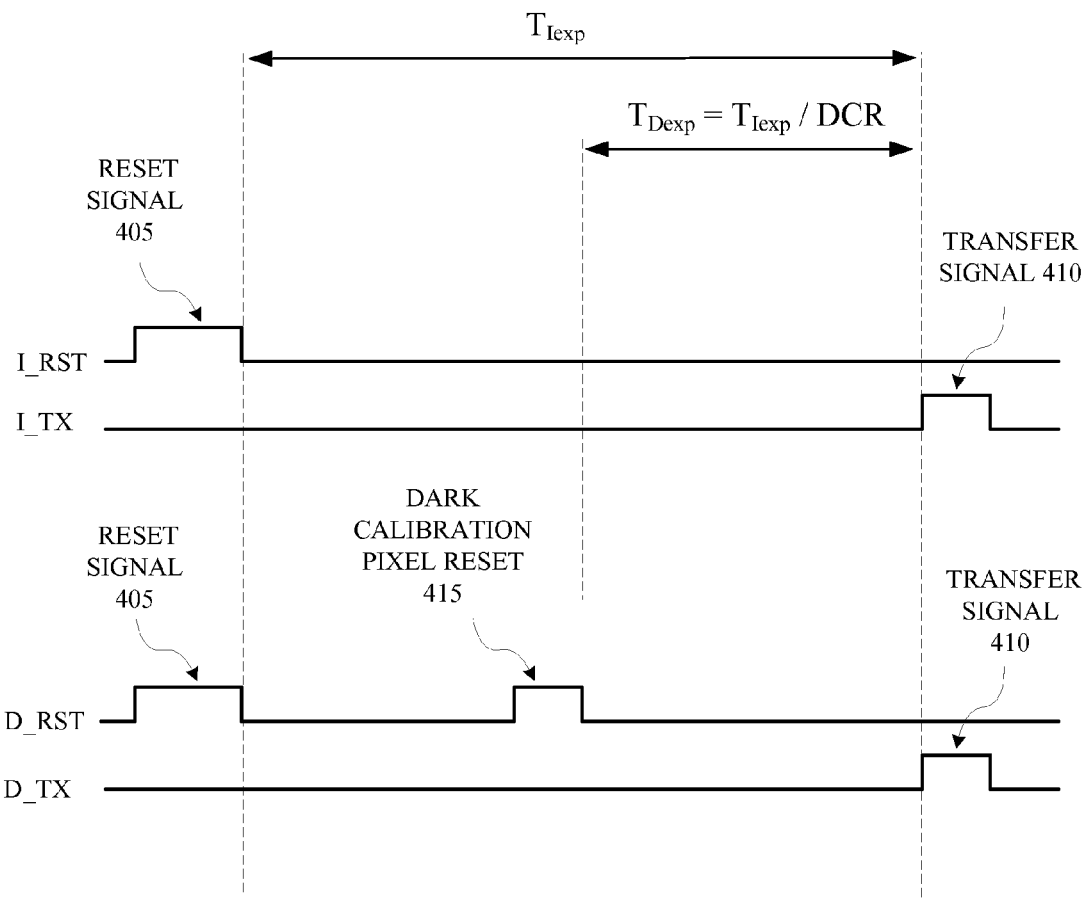
FIGS. 4A and 4B are signal sequence charts illustrating a signal sequence of an imaging pixel and a dark calibration pixel, in accordance with an embodiment of the disclosure.
Figure 4B:
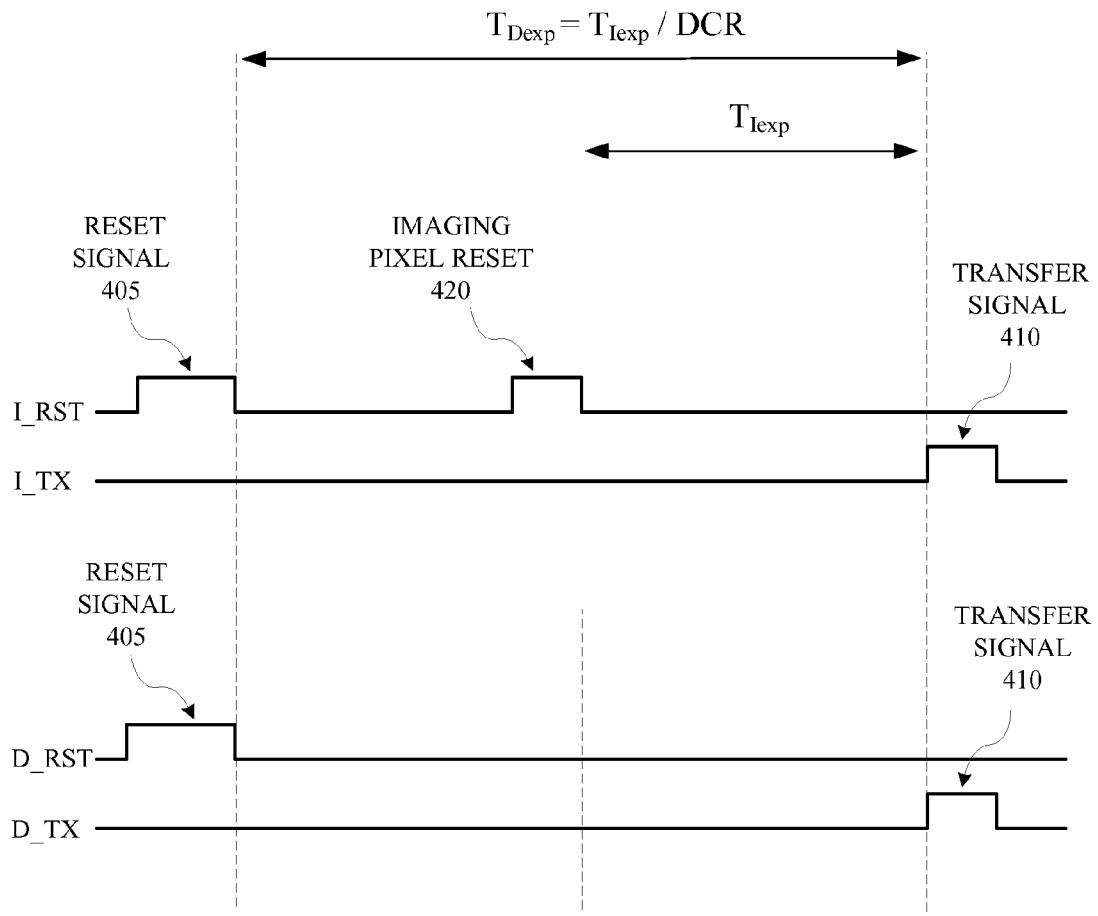

Setting different exposure times for imaging pixels 102 and dark calibration pixels 103 according to process block 315 and 320 may be achieved in various ways. FIG. 4A and FIG. 4B illustrate one approach of implementing a portion of process 300. FIG. 4A shows an exemplary signal sequence that could be used to define an exposure time (also known as "integration time") for imaging pixels 102 and dark calibration pixels 103, when the DCR is greater than 1.

FIG. 4A shows reset signal 405 asserted on a reset line (I_RST) of an imaging pixel which causes the pixel to "precharge." Reset signal 405 is then unasserted and the exposure time ($T_{Iexp}$) begins. During the exposure time, light may be incident on the imaging pixel, which may result in generation of negative charge (electrons) proportional to the amount of the light (photons) incident upon the pixel. Line 230 is one illustration of negative charges accumulating in response to incident light. At the end of the desired exposure period ($T_{Iexp}$) a transfer signal 410 is asserted on a transfer line (I_TX) of the imaging pixel, which causes the accumulated negative charge to be transferred out of the pixel to the readout circuitry.

FIG. 4A also shows reset signal 405 asserted and unasserted on a reset line (D_RST) of a dark calibration pixel at the same time as it is asserted and unasserted on the reset line of the imaging pixel. However, during the exposure period of the dark calibration pixel, a dark calibration pixel reset 415 is asserted on the reset line (D_RST) of the dark calibration pixel. This clears the dark calibration pixel of accumulated charge. Dark calibration pixel reset 415 is then unasserted at a time which allows the dark calibration pixel to have an exposure period of $T_{Dexp}$, where $T_{Dexp}=(T_{Iexp})/(DCR)$. At the end of the exposure period for the dark calibration period ($T_{Dexp}$), transfer signal 410 is asserted on a transfer line (D_TX) of the dark calibration pixel, which causes the accumulated negative charge to be transferred out of the pixel to the readout circuitry.

FIG. 4B shows an exemplary signal sequence that could be used to define an exposure time for imaging pixels 102 and dark calibration pixels 103, when the DCR is less than 1. Reset signal 405 is asserted on a reset line (I_RST) of the imaging pixel and on the reset line of the dark calibration pixel (D_RST). Reset signal 405 is then unasserted on both reset lines and the exposure time ($T_{Dexp}$) begins. In FIG. 4B, the dark calibration pixel has the longer exposure time ($T_{Dexp}$), which is also equal to ($T_{Iexp}$)/(DCR). In FIG. 4B, the image pixel receives imaging pixel reset 420 on the imaging pixel's reset line (I_RST) during the exposure period. This clears the imaging pixel of accumulated charge. Imaging pixel reset 420 is then unasserted at a time which allows the imaging pixel to have an exposure period ($T_{Iexp}$), which is less than the exposure period ($T_{Dexp}$) for the dark calibration pixel. At the end of the dark calibration pixel exposure period ($T_{Dexp}$), transfer signal 410 is asserted on a transfer line (I_TX) of the imaging pixel and on the transfer line (D_TX) of the dark calibration pixel. This causes the accumulated negative charge to be transferred out of the pixels to the readout circuitry.

FIGS. 4A and 4B are merely examples of signal sequences that could be sent to pixels to adjust the exposure period of pixels. Other sequences and schemes are possible. In one embodiment, dark calibration pixel reset 415 and reset signal 405 are merged into one longer reset signal. Likewise, imaging pixel reset 420 and reset signal 405 could also be merged into one longer reset signal. It is appreciated that the method and system described above may be used in connection with a global shutter as well as a rolling shutter. An advantage of merely changing the timing sequence (as shown in FIGS. 4A and 4B) to adjust the dark calibration pixel measurements to represent the dark current of an imaging pixel is that few or no changes need to be made to the underlying hardware. For example, there may not be a need to add extra timing circuitry or readout circuitry because it may already be integrated into an image sensor.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware logic, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for obtaining a corrected pixel value, the method comprising:
   measuring a first dark current of a dark calibration pixel of a pixel array;
   measuring a second dark current of an imaging pixel of the pixel array;
   calculating a dark current ratio based on the first dark current and the second dark current;
   acquiring an image charge with the imaging pixel accumulated over a first time period;
   acquiring a charge with the dark calibration pixel accumulated over a second time period approximately equal to the first time period divided by the dark current ratio; and
   calculating a corrected imaging pixel value using a first readout from the imaging pixel and a second readout from the dark calibration pixel.

2. The method of claim 1, wherein the dark calibration pixel is physically shielded from light and is disposed outside of an imaging region that includes the imaging pixel, the imaging region capable of being exposed to ambient light.

3. The method of claim 1, wherein the first readout corresponds to the image charge the imaging pixel accumulated as a result of light incident on the imaging pixel over the first time period and the second readout corresponds to the charge the black calibration pixel accumulated over the second time period.

4. The method of claim 1, further comprising:
   measuring a third dark current of at least a second dark calibration pixel, wherein calculating the dark current ratio includes combining the first dark current and the third dark current.

5. The method of claim 1, wherein calculating the corrected imaging pixel value includes subtracting the second readout from the first readout.

6. The method of claim 1, wherein acquiring the image charge with the imaging pixel and acquiring the charge with the dark calibration pixel includes:
   transmitting a first exposure signal to the imaging pixel and to the dark calibration pixel; and
   transmitting a reset signal followed by a second exposure signal to the dark calibration pixel to cause the second time period to be shorter than the first time period, if the dark current ratio is greater than one.

7. The method of claim 6, wherein the first exposure signal and the second exposure signal are a first voltage level, and wherein the reset signal is a second voltage level different than the first voltage level.

8. The method of claim 1, further comprising storing the dark current ratio in a memory communicatively coupled to a processor.

9. The method of claim 1, wherein measuring the first dark current and measuring the second dark current is completed when a mechanical shutter of a camera is closed, and wherein the pixel array is disposed in the camera.

10. A non-transitory machine-accessible storage medium that provides instructions that, when executed by an imaging system, will cause the imaging system to perform operations comprising:
    measuring a first dark current of a dark calibration pixel of a pixel array;
    measuring a second dark current of an imaging pixel of the pixel array;
    calculating a dark current ratio based on the first dark current and the second dark current;
    acquiring an image charge with an imaging pixel, wherein the imaging pixel accumulated the image charge over a first time period;
    acquiring a charge with the dark calibration pixel, wherein the dark calibration pixel accumulated the charge over a second time period approximately equal to the first time period divided by the dark current ratio; and
    calculating a corrected imaging pixel value using a first readout from the imaging pixel and a second readout from the dark calibration pixel.

11. The non-transitory machine-accessible storage medium of claim 10, wherein the dark calibration pixel is physically shielded from light and is disposed outside of an imaging region that includes the imaging pixel, the imaging region capable of being exposed to ambient light.

12. The non-transitory machine-accessible storage medium of claim 10, wherein the first readout corresponds to the image charge the imaging pixel accumulated as a result of light incident on the imaging pixel over the first time period and the second readout corresponds to the charge the black calibration pixel accumulated over the second time period.

13. The non-transitory machine-accessible storage medium of claim 10, further providing instructions that, when executed by the imaging system, will cause the imaging system to perform further operations, comprising:
    measuring a third dark current of at least a second dark calibration pixel, wherein calculating the dark current ratio includes combining the first dark current and the third dark current.

14. The non-transitory machine-accessible storage medium of claim 10, wherein calculating the corrected imaging pixel value includes subtracting the second readout from the first readout.

15. The non-transitory machine-accessible storage medium of claim 10, wherein acquiring the image charge with the imaging pixel and acquiring the charge with the dark calibration pixel includes:
    transmitting a first exposure signal to the imaging pixel and to the dark calibration pixel; and
    transmitting a reset signal followed by a second exposure signal to the dark calibration pixel to cause the second time period to be shorter than the first time period, if the dark current ratio is greater than one.

16. An imaging system comprising:
    a pixel array including a dark calibration pixel physically shielded from light and an imaging pixel disposed in an imaging region capable of being exposed to light;
    a processor coupled to process imaging data from the pixel array; and
    logic coupled to the processor and the pixel array, wherein the logic performs operations comprising:
        measuring a first dark current of the dark calibration pixel;
        measuring a second dark current of the imaging pixel;
        calculating a dark current ratio based on the first dark current and the second dark current;
        acquiring an image charge with the imaging pixel accumulated over a first time period;
        acquiring a charge with the dark calibration pixel accumulated over a second time period approximately equal to the first time period divided by the dark current ratio; and
        calculating a corrected imaging pixel value using a first readout from the imaging pixel and a second readout from the dark calibration pixel.

17. The imaging system of claim 16, wherein the first readout corresponds to the image charge the imaging pixel accumulated as a result of light incident on the imaging pixel over the first time period and the second readout corresponds to the charge the black calibration pixel accumulated over the second time period.

18. The imaging system of claim 16, wherein the logic further performs operations comprising:
    measuring a third dark current of at least a second dark calibration pixel, wherein calculating the dark current ratio includes combining the first dark current and the third dark current.

19. The imaging system of claim 16, wherein calculating the corrected imaging pixel value includes subtracting the second readout from the first readout.

20. The imaging system of claim 16, wherein acquiring the image charge with the imaging pixel and acquiring the charge with the dark calibration pixel includes:
    transmitting a first exposure signal to the imaging pixel and to the dark calibration pixel; and
    transmitting a reset signal followed by a second exposure signal to the dark calibration pixel to cause the second time period to be shorter than the first time period, if the dark current ratio is greater than one.

* * * * *